United States Patent
Seberger et al.

(10) Patent No.: US 10,185,291 B2
(45) Date of Patent: Jan. 22, 2019

(54) SYSTEM AND METHOD FOR SHUTTING DOWN A FIELD DEVICE

(71) Applicant: FISHER CONTROLS INTERNATIONAL LLC, Marshalltown, IA (US)

(72) Inventors: Stephen G. Seberger, Marshalltown, IA (US); Jimmie L. Snowbarger, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 754 days.

(21) Appl. No.: 13/931,239

(22) Filed: Jun. 28, 2013

(65) Prior Publication Data
US 2015/0005904 A1 Jan. 1, 2015

(51) Int. Cl.
*G05B 9/02* (2006.01)
*G05B 19/042* (2006.01)

(52) U.S. Cl.
CPC .......... *G05B 9/02* (2013.01); *G05B 19/0428* (2013.01); *G05B 2219/24031* (2013.01); *G05B 2219/24117* (2013.01); *G05B 2219/24211* (2013.01)

(58) Field of Classification Search
CPC .............. G05B 9/02; G05B 19/0428; G05B 2219/24117; G05B 2219/24031; G05B 2219/24211
See application file for complete search history.

(56) References Cited

U.S. PATENT DOCUMENTS

| | | | | | |
|---|---|---|---|---|---|
| 4,245,310 | A | * | 1/1981 | Kiefer | D06F 33/02 134/57 D |
| 5,063,527 | A | * | 11/1991 | Price | G05B 19/058 431/24 |
| 5,746,203 | A | * | 5/1998 | Hood, Jr. | A61B 5/00 600/300 |
| 5,947,907 | A | * | 9/1999 | Duich | A61B 5/02055 600/483 |
| 6,385,562 | B1 | * | 5/2002 | Roth | G05B 19/406 702/188 |

(Continued)

FOREIGN PATENT DOCUMENTS

| | | | |
|---|---|---|---|
| CN | 1947077 A | 4/2007 | |
| EP | 1832943 A1 | 9/2007 | |
| WO | WO 2007018876 A1 * | 2/2007 | ............. G05B 9/02 |

OTHER PUBLICATIONS

The International Search Report and the Written Opinion of the European Patent Office, dated Oct. 28, 2014, International Application No. PCT/US2014/044486 (12 pages).

(Continued)

*Primary Examiner* — M. N. Von Buhr
(74) *Attorney, Agent, or Firm* — Marshall, Gerstein & Borun LLP

(57) ABSTRACT

A diagnostic system and method for a field device implemented in a safety instrumented system includes detecting an occurrence of a safety event associated with the field device, overriding normal control of the field device to cause the field device to enter a safe state in response to the detected occurrence of the safety event, verifying the override of normal control of the field device, and transmitting a control signal to cause the field device to enter the safe state.

12 Claims, 3 Drawing Sheets

(56) References Cited

U.S. PATENT DOCUMENTS

| | | | | |
|---|---|---|---|---|
| 7,308,337 | B2* | 12/2007 | Sparenborg | B66C 13/48 |
| | | | | 212/273 |
| 7,556,238 | B2* | 7/2009 | Seberger | F16K 37/0083 |
| | | | | 251/129.04 |
| 7,792,599 | B2 | 9/2010 | Braun | |
| 9,098,074 | B2* | 8/2015 | Moosmann | G05B 9/03 |
| 9,122,253 | B2* | 9/2015 | Block | G05B 9/02 |
| 9,158,303 | B2* | 10/2015 | Mazzaro | G05B 23/0251 |
| 9,280,617 | B2* | 3/2016 | Mazzaro | G06F 17/5009 |
| 9,551,633 | B2* | 1/2017 | Mazzaro | G01M 99/005 |
| 9,753,437 | B2* | 9/2017 | Ishii | G05B 9/03 |
| 2001/0050543 | A1* | 12/2001 | Zeilinger | G05B 19/058 |
| | | | | 320/137 |
| 2003/0161480 | A1* | 8/2003 | Muldoon | H02H 7/0844 |
| | | | | 381/56 |
| 2005/0109395 | A1* | 5/2005 | Seberger | G05B 9/02 |
| | | | | 137/8 |
| 2005/0122078 | A1* | 6/2005 | Hashimoto | H01H 47/004 |
| | | | | 318/449 |
| 2005/0283338 | A1* | 12/2005 | Frederick | G05B 19/042 |
| | | | | 702/182 |
| 2007/0150155 | A1* | 6/2007 | Kawai | A61B 1/00059 |
| | | | | 701/72 |
| 2007/0161861 | A1* | 7/2007 | Kawai | A61B 1/00055 |
| | | | | 600/145 |
| 2008/0163936 | A1* | 7/2008 | Boger | F15B 5/006 |
| | | | | 137/455 |
| 2008/0221726 | A1* | 9/2008 | Rotzler | G05B 19/042 |
| | | | | 700/213 |
| 2009/0216350 | A1* | 8/2009 | Boger | F15B 5/006 |
| | | | | 700/79 |
| 2012/0158192 | A1* | 6/2012 | Sherwood | G01C 21/3492 |
| | | | | 700/282 |
| 2012/0299578 | A1* | 11/2012 | Korrek | G05B 9/02 |
| | | | | 324/76.15 |
| 2013/0246333 | A1* | 9/2013 | Presgraves | G06F 17/50 |
| | | | | 706/59 |
| 2013/0317780 | A1* | 11/2013 | Agarwal | G05B 23/0248 |
| | | | | 702/181 |
| 2014/0097700 | A1* | 4/2014 | Law | H02H 3/05 |
| | | | | 307/112 |

OTHER PUBLICATIONS

International Preliminary Report on Patentability and Written Opinion of the International Searching Authority in counterpart International Application No. PCT/US2014/044486, dated Dec. 29, 2015.
Office Action in Chinese Patent Application No. 201410281400.4, dated Sep. 28, 2017.
Office Action in Russian Patent Application No. 2016101149, dated Dec. 11, 2017.

* cited by examiner

SYSTEM AND METHOD FOR SHUTTING DOWN A FIELD DEVICE

FIELD OF THE DISCLOSURE

This disclosure relates generally to controlling a field device in a safety instrumented system and, more particularly, to a system and method for placing the field device in a safe state.

BACKGROUND

Process control systems such as those used in chemical, petroleum, and other processes, typically include one or more controllers communicatively coupled to at least one host or user workstation and to one or more field devices via analog, digital, or combined analog/digital bus(es). The field devices, which may include, for example, control valves, valve positioners, switches, and transmitters (e.g., temperature, pressure and flow rate sensors), perform functions within the process such as opening or closing valves and measuring process parameters. The process controller receives signals indicative of process measurements made by the field devices and/or other information pertaining to the field devices, and uses this information to implement a control routine to generate control signals, which are sent over the bus to the field devices to control the operation of the process. In the event that a field device fails, the operational state of the entire process control system can be jeopardized.

A safety instrumented system (SIS) may be utilized to safeguard the process control system to prevent a dangerous event, such as a release of toxic, flammable, or explosive chemicals. The SIS is a distinct, reliable system used to complement the process control system and take action to bring the process control system to a safe state when necessary. The SIS utilizes sensors, logic solvers, and actuators to implement a safety instrumented function (SIF) to reach or maintain a safe state. A safety integrity level (SIL) is a statistical representation of the integrity of the SIS and can be defined in terms of a risk reduction factor (RRF). In other words, the SIL is one way to indicate the tolerable failure rate of a particular safety function. The inverse of the RRF is the probability of failure on demand (PFD) and several discrete SIL levels are associated with a PFD wherein SIL level 1 represents the highest level of acceptable risk and SIL level 4 represents the lowest level of acceptable risk.

The SIS may typically be comprised of two types of devices, equipment, subsystems, or modules; namely, Type A and Type B. In general, Type A classified units are devices without a complex processor on board and all possible failures of each component, e.g., valves, relays, solenoids, switches, etc., can be defined. Type B classified units include at least one component having a failure mode that is not well defined, e.g., microprocessors, application specific integrated circuits (ASICs), "smart" transmitters. In terms of safety, failures can be divided into two categories: safe failures and dangerous failures. Safe failures are those failures at the level of the modules and subsystems inside the device that lead to a safe state and which may or may not be detected by internal diagnostics. A dangerous failure is a failure that does not lead to a safe state. However, a dangerous failure may be detected by internal diagnostics, which alert the user to the failure and allow timely repair such that the probability of failure on demand (PFD) is not impacted as it would be if the failure could occur without detection. A safe failure fraction (SFF) parameter indicates the fraction of the overall failure rate of a device that results in a safe failure as compared to all failures. The SFF can be defined as 1−(dangerous undetected failures)/(total failures), wherein total failures includes detected safe failures, undetected safe failures, detected dangerous failures, and undetected dangerous failures. Undetected dangerous failures adversely affect the PFD and/or SFF associated with the device.

SUMMARY

Example systems and methods to improve control of plant operations are herein described. In one example method implemented on a computer device, a method of controlling a field device implemented in a safety instrumented system includes detecting, at a hardware module, an occurrence of a safety event associated with a field device implemented in a safety instrumented system, overriding, at a hardware module, normal control of the field device to cause the field device to enter a safe state in response to the detected occurrence of the safety event, detecting, at a software module, the occurrence of the safety event associated with the field device of the safety instrumented system, monitoring, at a software module, the overriding of normal control of the field device, verifying, at a software module, the overriding of normal control of the field device, and transmitting, at a software module, a software control signal to cause the field device to enter the safe state.

In another example embodiment, a system for controlling a control element implemented in a safety instrumented system includes a field device having a hardware module operatively coupled to a software module. The hardware module is operatively coupled to a control input of a transducer device, and the hardware module is responsive to an occurrence of a safety event, whereupon detection of the occurrence of the safety event, the hardware module overrides software control of the field device and transmits a hardware control signal to drive the transducer device to the safe state. The software module includes a processor operatively coupled to a memory and the control input of the transducer device. The software module is responsive to the occurrence of the safety event, whereupon detection of the occurrence of the safety event, the software module verifies the override of control of the field device by the hardware module and then transmits a software control signal to take the transducer device to the safe state.

In a further example embodiment, a system for controlling a control element implemented in a safety instrumented system includes a means for detecting an occurrence of a safety event associated with a field device implemented in a safety instrumented system, a means for overriding normal control of the field device to cause the field device to enter a safe state in response to the detected occurrence of the safety event, a means for monitoring the overriding of normal control of the field device, a means for verifying the override of normal control of the field device, and a means for transmitting a software control signal to cause the field device to enter the safe state.

In yet another example embodiment, a tangible non-transitory computer-readable medium includes instructions stored thereon that, when executed by one or more processors, cause the one or more processors to detect, at a software module, the occurrence of the safety event associated with the field device of the safety instrumented system; monitor, at a software module, an override by a hardware module of normal control of the field device; verify, at a software module, the override by the hardware module of normal control of the field device; and transmit, at a software module, a software control signal to cause the field device to enter the safe state.

In further accordance with the inventive aspects described herein, any one or more of the foregoing embodiments may further include any one or more of the following forms.

In another form, monitoring the overriding normal control of the field device includes monitoring a hardware control signal operatively coupled to an input of the field device.

In another form, verifying the overriding normal control of the field device includes comparing a safe-state signal to the hardware control signal.

In another form, the method includes recording verification of the overriding normal control of the field device.

In another form, recording verification of the overriding normal control of the field device includes registering a detected failure if the monitored hardware control signal does not equate to the safe-state signal.

In another form, the system includes a control signal transducer operatively coupled between the hardware module and the field device, the control signal transducer further operatively coupled between the software module and the field device.

In another form, the control signal transducer is a current-to-pressure (I/P) transducer or a voltage-to-pressure (E/P) transducer.

In another form, the system includes a first sensor operatively coupled to the hardware module for detecting the occurrence of the safety event, whereupon detection of the occurrence of the safety event, the first sensor initiates providing the hardware control signal from the hardware module to the control signal transducer, and a second sensor operatively coupled to the software module for detecting the occurrence of the safety event, whereupon detection of the occurrence of the safety event, the second sensor initiates transmission of the software control signal from the software module to the control signal transducer. Alternatively, the first and second sensors need not be separate sensors, but may be a single sensor. That is, a single sensor for detecting the occurrence of the safety event may be operatively coupled to the hardware module and the software module, whereupon detection of the occurrence of the safety event, the single sensor initiates providing the hardware control signal from the hardware module and the software control signal from the software module.

In another form, the field device is a pneumatic valve controller including a hardware module classified as a Type A device and a software module classified as a Type B device.

DETAILED DESCRIPTION

Figure 1:
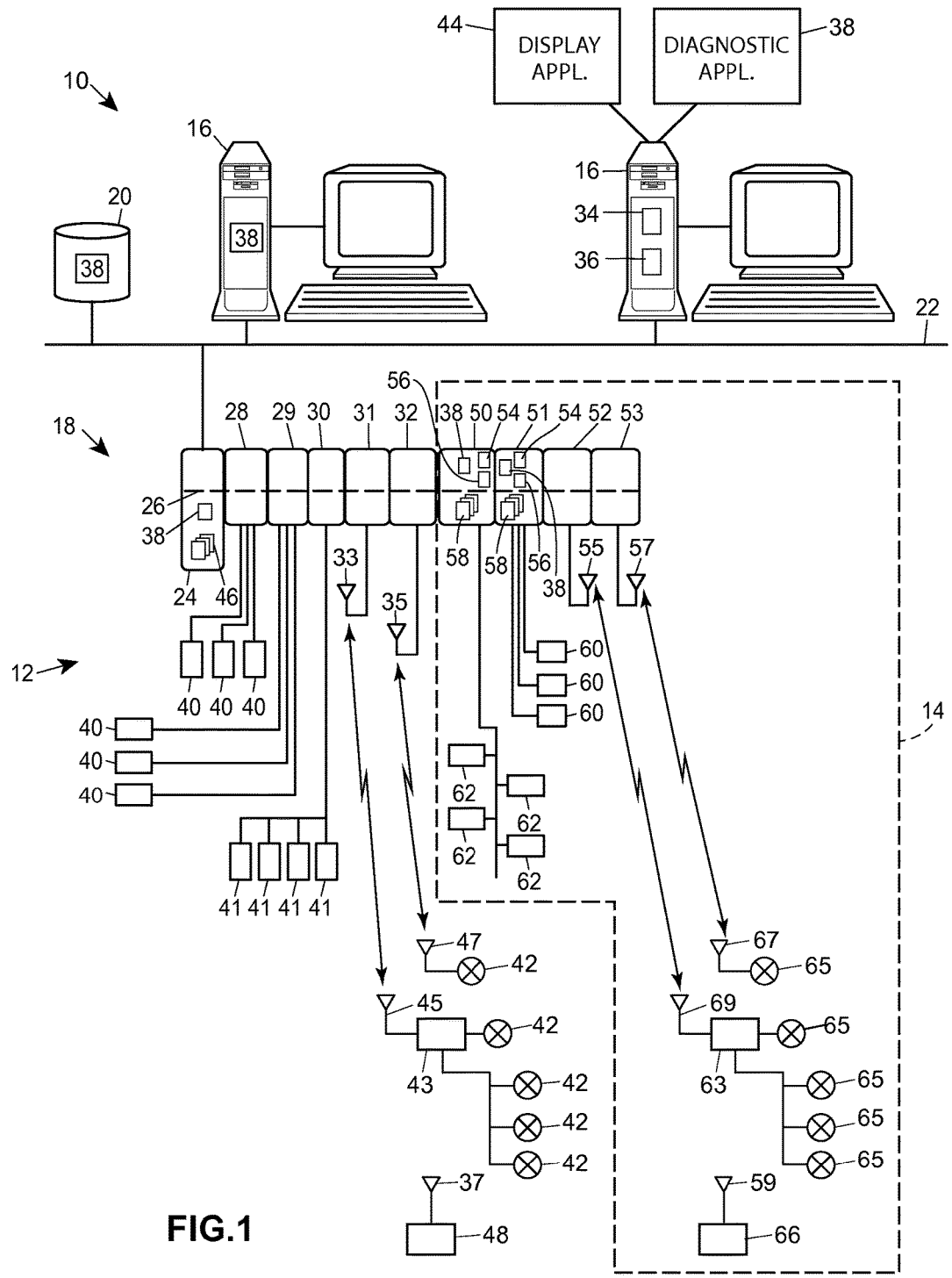
FIG. 1 is a schematic representation of an exemplary process plant having a process control system and a safety instrumented system.

The present disclosure is directed to providing a control system and method to ensure bringing a field device implemented within a safety instrumented system to a safe state. An exemplary process plant 10 shown in FIG. 1 capable of implementing one or more embodiments of the present invention includes a process control system 12 and a safety system 14 (depicted within dotted lines) that generally operates as a safety instrumented system (SIS). The SIS 14 is capable of executing safety instrumented functions (SIF) to achieve or maintain a safe status in the process control system 12. If necessary, the SIS 14 may override control of the process control system 12.

The process plant 10 includes one or more host workstations 16 or computing devices such as a personal computer, for example, having a user interface including a keyboard and a display screen that are accessible by plant personnel. In the example illustrated in FIG. 1, two workstations 16 are shown as being connected to a process control/safety control node 18 and to a data historian 20 via a common communication line or bus 22. The data historian 20 may be any desired type of data collection unit having any desired type of memory and any desired or known software, hardware, or firmware for storing data. While the data historian 20 is illustrated as a separate device in FIG. 1, it may instead or in addition be part of one of the workstations 16 or another device, such as a server. The communication bus 22 may be implemented using any desired bus-based or non-bus-based hardware, using any desired wired or wireless communication structure, and using any desired or suitable communication protocol, such as an Ethernet protocol.

In general, the process plant 10 includes both process control system devices and safety system devices operatively connected together via the bus structure that may be provided on a backplane 26 into which different process controllers and input/output devices are attached. The process plant 10 illustrated in FIG. 1 includes at least one process controller 24 as well as one or more process control system input/output (I/O) devices 28, 29, 30, 31, 32. Each of the process control system I/O devices 28, 29, 30, 31, 32 is communicatively connected to a set of process control related field devices, illustrated in FIG. 1 as field devices 40, 41, 42, 48. The process controller 24, the I/O devices 28, 29, 30, 31, 32, and the controller field devices 40, 41, 42, 48 generally make up the process control system 12 of FIG. 1.

The process controller 24, which may be, by way of example only, a DeltaV™ controller sold by Emerson Process Management or any other desired type of process controller, is programmed to provide process control functionality using the I/O devices 28, 29, 30, 31, 32 and the field devices 40, 41, 42, 48. In particular, the controller 24 implements or oversees one or more process control modules 46 or routines stored in memory therein or otherwise associated therewith and communicates with the field devices 40, 41, 42, 48 and the workstations 16 to control the process plant 10 or a portion of the process plant 10 in any desired manner.

The control routines 46, which may be control modules or any part of a control procedure such as a subroutine, parts of a subroutine (such as lines of code), etc., may be implemented in any desired software format, such as using ladder logic, sequential function charts, control routine diagrams, object oriented programming, or any other software programming language or design paradigm. Likewise, the control routines described herein may be hard-coded into, for example, one or more EPROMs, EEPROMs, application specific integrated circuits (ASICs), PLCs, or any other hardware or firmware elements. The control routines may be designed using any design tools, including graphical design tools or any other type of software/hardware/firmware programming or design tools.

The controller 24 may be configured to implement a control routine or a control strategy in any desired manner. For example, the controller 24 may implement a control strategy using what are commonly referred to as function blocks, wherein each function block is a part or object of an overall control routine and operates in conjunction with other function blocks (via communications called links) to implement process control loops within the process control system 12. Function blocks typically perform one of: an input function such as that associated with a transmitter, a sensor, or other process parameter measurement device; a control function such as that associated with a control routine that performs PID, fuzzy logic, etc. control; or, an output function that controls the operation of some device such as a valve to perform some physical function within the process control system 12. Hybrids of these function blocks, as well as other types of function blocks, may also exist.

The function blocks and control routines may be stored in and executed by the controller 24, which is typically the case when these function blocks are used for, or are associated with, standard 4-20 ma devices and some types of smart field devices such as HART devices. The function blocks and control routines may also be stored in and implemented by the field devices themselves, which may be the case with Fieldbus devices.

For the purposes of this disclosure, the terms control strategy, control routine, control module, control function block, safety module, safety logic module, and control loop essentially denote a control program executed to control the process and these terms may be interchangeably used herein. However, for the purposes of the following discussion, the term module will be used. It should further be noted that module described herein may have parts thereof implemented or executed by different controllers or other devices if so desired. In addition, the modules described herein to be implemented within the process control system 12 and the safety system 14 may take any form, including software, firmware, hardware, and any combination thereof.

The field devices 40, 41, 42, 48 may be any desired type, such as sensors, valves, transmitters, positioners, etc., and may conform to any desired open, proprietary, or other wired and/or wireless communication or programming protocol including, for example, the HART or the 4-20 ma protocol (as illustrated for the field devices 40), any bus protocol such as the Foundation® Fieldbus protocol (as illustrated for the field devices 41), or the CAN, Profibus, and AS-Interface protocols, to name but a few. Similarly, each of the I/O devices 28, 29, 30, 31, 32 may be any known type of process control I/O device using any appropriate communication protocol.

In addition to or in place of wired communication, wireless communications may be established between the controller 24 and the field devices 40, 41, 42, 48 using any desired wireless communication equipment, including hardware, software, firmware, or any combination thereof now known or later developed. In the embodiment illustrated in FIG. 1, an antenna 47 is coupled to and is dedicated to perform wireless communications for the transmitter 42, while a wireless router or other module 43 having an antenna 45 is coupled to collectively handle wireless communications for the transmitters 42 operatively coupled thereto. Similarly, an antenna 37 is coupled to the control valve assembly 48 to perform wireless communications for the control valve assembly. The field devices or associated hardware 40, 41, 42, 48 may implement protocol stack operations used by an appropriate wireless communication protocol to receive, decode, route, encode and send wireless signals via the antennas 37, 45, 47 to implement wireless communications between the process controller 24 and the transmitters 42 and the control valve assembly 48.

If desired, the transmitters 42 can constitute the sole link between various process sensors (transmitters) and the process controller 24 and, as such, are relied upon to send accurate signals to the controller 24 to ensure that process performance is not compromised. The transmitters, often referred to as process variable transmitters (PVTs), therefore may play a significant role in the control of the overall control process. Additionally, the control valve assembly 48 may provide measurements made by sensors within the control valve assembly 48 or may provide other data generated by or computed by the control valve assembly 48 to the controller 24 as part of its operation. Of course, as is known, the control valve assembly 48 may also receive control signals from the controller 24 to effect physical parameters, e.g., flow, within the overall process.

The process controller 24 is coupled to one or more I/O devices 31, 32, each connected to a respective antenna 33, 35, and these I/O devices and antennas operate as transmitters/receivers to perform wireless communications with the wireless field devices 42, 48 via one or more wireless communication networks. The wireless communications between the field devices may be performed using one or more known wireless communication protocols, such as the WirelessHART® protocol, the Ember protocol, a WiFi protocol, an IEEE wireless standard, etc. Still further, the I/O devices 31, 32 may implement protocol stack operations used by these communication protocols to receive, decode, route, encode and send wireless signals via the antennas 33, 35 to implement wireless communications between the controller 24 and the transmitters and the control valve assembly 48.

The process plant 10 also includes one or more safety system logic solvers 50, 51, 52, 53. Each of the logic solvers 51, 52, 53, 54 may be a safety controller (also invariably referred to as an I/O device) having a processor 54 that executes safety logic modules 58 stored in memory and is communicatively connected to provide control signals to and/or receive signals from safety system field devices 60, 62, 65, 66. The safety controllers 50, 51, 52, 53 and the safety system field devices 60, 62, 65, 66 generally make up the safety system 14 (SIS) of FIG. 1.

The safety field devices 60, 62, 65, 66 may be any desired type of field device conforming to or using any known or desired wired and/or wireless communication protocol, such as those mentioned above with respect to the process control system 12. In particular, the field devices 60, 62, 65, 66 may be safety-related field devices of the type that are conventionally controlled by a separate, dedicated safety-related control system, such as an emergency shutdown (ESD) valve. In the process plant 10 illustrated in FIG. 1, the safety field devices 60 are depicted as using a dedicated or point-to-point communication protocol, such as the HART or the 4-20 ma protocol, while the safety field devices 62 are illustrated as using a bus communication protocol, such as a Fieldbus protocol. Generally, the safety devices (both the controllers 50, 51, 52, 53 and the safety system field devices 60, 62, 65, 66) used as part of the safety system 14 will be rated as safety devices, which typically means that these devices must go through a rating procedure to be rated by an appropriate body as a safety device.

Similar to the process control system 12, the safety system 14 may also include a number of wireless field devices 65, 66 disposed in the plant to be controlled. The field devices 65, 66 may include transmitters 65, such as process variable sensors as well as a control valve assembly 66 including a control valve and an actuator for example. Wireless communications may be established between the safety controller 50, 51, 52, 53 and the field devices 60, 62, 65, 66 using any desired wireless communication equipment, including hardware, software, firmware, or any combination thereof now known or later developed. In the embodiment illustrated in FIG. 1, an antenna 67 is coupled to and is dedicated to perform wireless communications for the transmitter 65, while a wireless router or other module 63 having an antenna 69 is coupled to collectively handle wireless communications for the transmitters 65 operatively coupled thereto. Similarly, an antenna 59 is coupled to the control valve assembly 66 to perform wireless communications for the control valve assembly. The field devices or associated hardware 60, 62, 65, 66 may implement protocol stack operations used by an appropriate wireless communication protocol to receive, decode, route, encode and send wireless signals via the antennas 59, 67, 69 to implement wireless communications between the safety controller 50, 51, 52, 53 and the transmitters 65 and the control valve assembly 66.

Each transmitter 65 can constitute one of several links between various process sensors (transmitters) and the safety controller 50, 51, 52, 53 and, as such, are relied upon to send accurate signals to the safety controller to ensure that process performance is not compromised. Additionally, the control valve assembly 66 may provide measurements made by sensors within the control valve assembly or may provide other data generated by or computed by the control valve assembly to the controller 50, 51, 52, 53 as part of its operation. Of course, as is known, the control valve assembly 66 may also receive control signals from the controller 50, 51, 52, 53 to effect physical parameters, e.g., flow, within the overall process.

The common backplane 26 (indicated by a dashed line through the process controller 24, the I/O devices 28, 29, 30, 31, 32 and the safety controllers 50, 51, 52, 53) is used to connect the process controller 24 to the process control I/O cards 28, 29, 30, 31, 32, as well as to the safety controllers 50, 51, 52, 53. The process controller 24 is also communicatively coupled to the bus 22 and may operate as a bus arbitrator to enable each of the I/O devices 28, 29, 30, 31 32 and the safety controllers 50, 51, 52, 53 to communicate with any of the workstations 16 via the bus 22. The backplane 26 further enables the safety controllers 50, 51, 52, 53 to communicate with one another and coordinate safety functions implemented by each of these devices, to communicate data to one another, or to perform other integrated functions.

Each of the workstations 16 includes a workstation processor 34 and a memory 36 that may store applications or modules adapted to be executed by any of the processors 24, 34, 50, 51, 52, 53 within the process plant 10. A display application 44 is illustrated in an exploded view in FIG. 1 as being stored in the memory 36 of one of the workstations 16. However, if desired, the display application 44 may be stored and executed in a different workstation 16 or in another computing device associated with the process plant 10. The display application 44 may be any type of interface that, for example, enables a user to manipulate data values (for example, perform reads or writes) to thereby alter operation of the control 46 modules or safety modules 58 within either or both of the control system 12 and the safety system 14. Thus, if a write is specified to be made to the control module 46 associated with the control system 12 or to one of the field devices 40, 41, 42, 48, for example, the display application 44 enables that write to take place. Additionally, if the write is specified to be made to the safety logic module 58 associated with the safety system 14 or to one of the field devices 60, 62, 65, 66 for example, the display application 44 enables that write to occur.

A diagnostic application 38, which may include one or more diagnostic modules, for example, may also be stored in the memory of the workstation 16 for later use by plant personnel in the control 12 or safety 14 systems. Generally speaking, when executed by the respective processors 24, 34, 50, 51, 52, 53 in the control 12 or safety 14 systems, the diagnostic application 38 is capable of checking or testing the operating state of the field devices 40, 41, 42, 48, 60, 62, 65, 66 being used therein. For example, a control loop tuner (which may, for example, be used on either the process control system control loop 12 or the safety system control loop 14) may be one module within the diagnostic application 38, control module 46, or safety logic module 58 capable of being executed by the processors 24, 34, 50, 51, 52, 53. A user may select to run this particular module when diagnostic data about the control loop indicates that a control loop is poorly tuned or not operating within desired tolerances.

Another example diagnostic application 38 includes a redundant safety check module for ensuring the functional performance of a field device used in the safety system 14. The redundant safety check module may include a hardware module and a software module each separately configured to bring a field device to a safe state, e.g., shutdown, in response to the detection of an occurrence of a safety event requiring the field device to be placed in a safe state. To allow the device to be classified as Type A, the hardware module is designed to bring the field device to the safe state upon detection of a safety event with no dependence on a software module. The Type B software module is also designed to respond to the safety event by setting its output to the safe state, which will bring the field device to the safe state even if the hardware module fails to override the software module. Thus, if the hardware module fails to bring the field device to the safe state, the software module will bring the field device to the safe state. In addition, the software module may monitor the safety function of the hardware module and record the instances when the hardware module successfully initiated bringing the valve to the safe state and/or failed to successfully initiate bringing the valve to the safe state.

Figure 2:
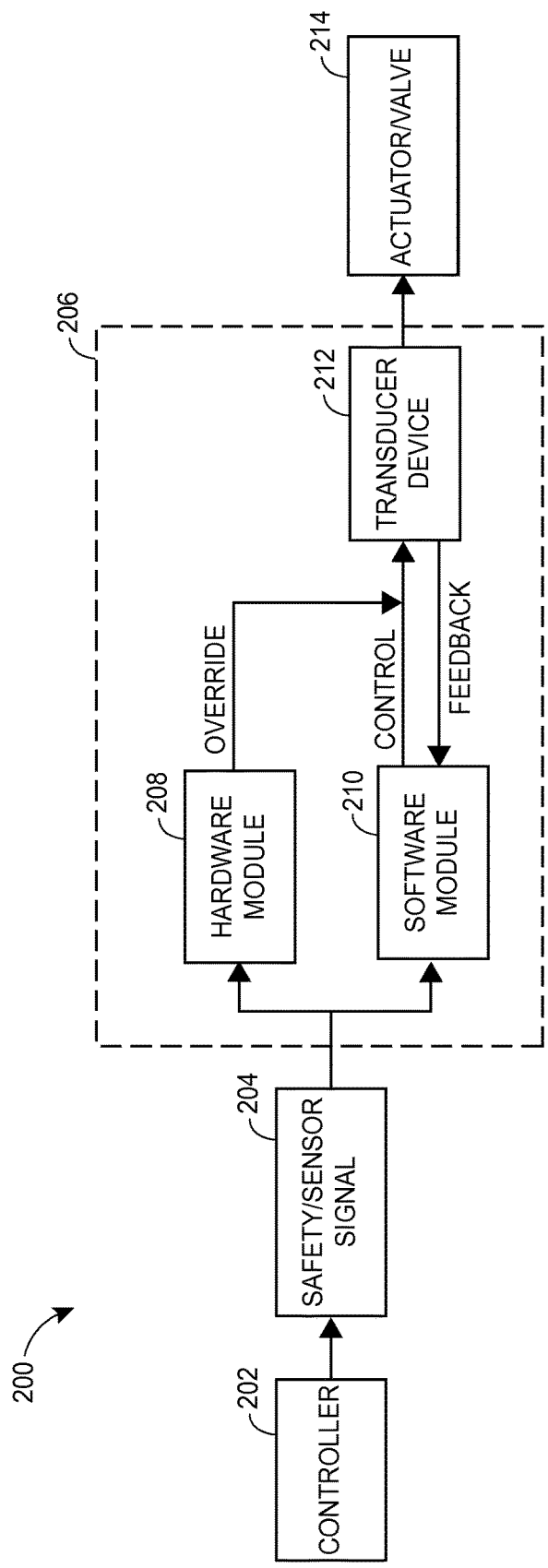
FIG. 2 is a block diagram of an exemplary configuration of a portion of a process plant (constructed in accordance with the principles of the present disclosure) for placing a final control element, such as a valve, in a safe state.

FIG. 2 depicts a block diagram of an example configuration 200 for normal control and safety shutdown of a field device. In this embodiment, the safety system includes a field device 206 that is responsive to both a normal control signal and the occurrence of a safety event communicated by a change in the control signal. The field device 206 may be a controller for a final control element 214, such as a pneumatically controlled valve, etc., that is required to be opened or closed when a safety event occurs. The occurrence of the safety event may be detected by another device within the safety system, such as a controller 202 or sensor, or by control personnel. For example, a sensor and/or processor within the controller 202 may detect the occurrence of the safety event and send a safety/sensor signal to the field device 206 that facilitates movement via a transducer device 212 of an actuator and/or valve 214. Upon receiving the safety/sensor signal from the sensor 204, a hardware module 208 provides a hardware control signal (for example, override signal) to the transducer device 212 that outputs a corresponding control pressure signal to the actuator/valve 214 to open or close the valve. The transducer device 212 may be a current-to-pressure device or a voltage-to-pressure device. In short, the hardware module 208 effectively overrides normal control of the field device 206 that is typically performed by a software module 210, which may include a processor and I/O devices such as the controller depicted in FIG. 1. The software module 210 may independently detect the occurrence of the safety event via the safety/sensor signal 204 transmitted to the software module by the same or other controller or sensor of the safety system, or by control personnel. Upon receipt of the safety/sensor signal, the software module 210 will monitor and/or verify that the hardware module 208 has provided a hardware control signal to the transducer device 212. The software module may monitor the override by the hardware module via a feedback signal received from the transducer device (for example, I/P readback signal). The software module may verify that the hardware module has initiated the override of normal control of the field device (or transducer) by comparing the hardware control signal to a safe-state signal. If the software module 210 determines that the hardware module 208 has not overridden control of the field device 206, or initiated an override of the field device 206, and provided the hardware control signal to the transducer device 212, the software module 210 may record and/or report the failure. Whether or not the hardware module 208 worked properly, the software module 210 will transmit a software control signal (for example, control signal) to the transducer device 212. In either case, the software control signal will be converted to a control pressure signal at the transducer device 212 to be sent to open and/or close the actuator/valve 214. If the hardware module 208 satisfactorily performed the override function, the software control signal will have no effect. However, if the hardware module 208 failed to perform its override function, the software control signal will bring the valve 214 to the safe state.

Figure 3:
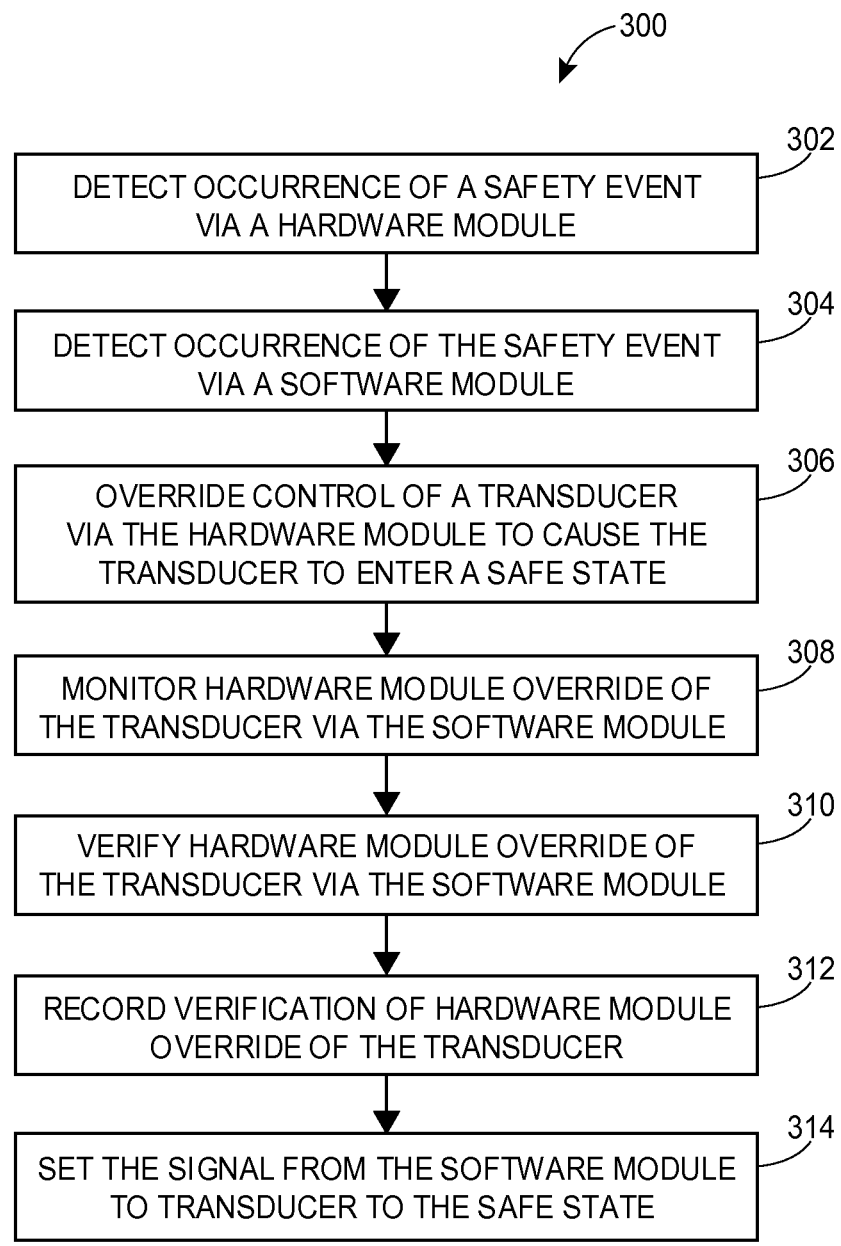
FIG. 3 illustrates an example module or process flow diagram capable of being used in the process plant depicted in FIG. 2 to place the field device in a safe state.

Referring now to FIG. 3, a flowchart of an example method 300 of one embodiment of the invention capable of being implemented in the control system depicted in FIG. 1 or 2 is shown. In particular, an occurrence of a safety event is detected by a hardware module (block 302). The occurrence of the safety event is also detected by a software module (block 304). The safety event may be an event requiring a field device and/or a control element controlled by the field device to be placed in a safe state, such as fully opening or closing an emergency shutdown valve. In response to detecting the occurrence of the safety event, the hardware module causes the valve via an actuator to enter a safe or shutdown state (block 306). That is, the hardware module is able to independently assume control of the valve by providing a hardware control signal to a transducer device that is operatively coupled to the actuator/valve. The software module, which may normally control operation of the actuator/valve via the transducer device, monitors the override performed by the hardware module (block 308) and verifies that the hardware module has initiated providing the hardware control signal to transducer device to place the actuator/valve into the safe state, e.g., shutdown state (block 310). In one embodiment, the software module may monitor the hardware control signal provided in the form of electrical current to an I/P transducer device to verify the hardware module override. The software module may verify the override by the hardware module by comparing the hardware control signal (for example, override signal) provided by the hardware module to a safe-state signal. If the hardware control signal equates to the safe-state signal, the override has been initiated by the hardware module. If the hardware control signal does not equate to the safe-state signal, the hardware module failed to initiate the override. The software module records the verification and may store any content associated with the verification in a memory device (block 312). For example, if the hardware device satisfactorily performed initiation of the shutdown of the valve, the software module will record it accordingly. On the other hand, if the hardware module did not satisfactorily initiate the shutdown of the valve, the software model accordingly records that information. In addition, whether or not the hardware device caused the actuator/valve to enter the safe state, the software module transmits a software control signal to the transducer device to enter the safe state (block 314). The software control signal is preferably transmitted from the software module after the software module has verified that the hardware module did or did not override control of the transducer device and/or the actuator/valve by providing the hardware control signal thereto.

The system and method described above implements two separate functions, each of which would cause a shutdown should the other fail, thereby providing redundancy of the function and a higher reliability than either implementation alone. In particular, a field device incorporates a Type A classified hardware module in cooperation with a Type B classified software module, wherein the traditionally dependable aspects of the hardware module are supported by the software module to bring the field device and/or final control element to a safe state. The detection by the software module of the hardware module's failure to override control of the field device to effect a shutdown allows those failures to be excluded from the calculation of the safe failure fraction (SFF) parameter and/or probability of failure on demand (PFD) value associated with the field device. By increasing the amount of detected failures of the hardware module, the SFF and/or PFD of the field device can thereby be improved. A field device with an improved SFF and/or PFD may avoid the need for redundant equipment within the safety instrumented system and/or may allow for less frequent diagnostic testing to achieve a required PFD average.

Although certain example methods, apparatus and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A method of controlling a field device implemented in a safety instrumented system (SIS) operatively coupled to a process control system, the field device associated with a safe-failure-fraction value, the method comprising:

detecting, by a hardware module classified as an SIS Type A module having all possible component failures defined and absent a processor, an occurrence of a safety event requiring the field device to be placed in a safe-state;

overriding, by the hardware module, normal control of the field device to cause the field device to enter the safe-state in response to the detected occurrence of the safety event by the hardware module, wherein overriding normal control of the field device includes the hardware module providing a hardware control signal to cause the field device to enter the safe-state;

monitoring, by a software module classified as an SIS Type B module including an undefined component failure and a processor, the hardware control signal provided by the hardware module to determine whether the hardware module overrode normal control of the field device;

detecting, by the software module, the occurrence of the safety event requiring the field device to be placed in the safe-state;

transmitting, by the software module, a software control signal to cause the field device to enter the safe-state;

calculating, by the software module, the safe-failure fraction value of the field device based on detection of the safety event by the hardware module and whether the hardware control signal was provided by the hardware module to cause the field device to enter the safe-state.

2. The method of claim 1, further comprising:

calculating, by the software module, the safe-failure fraction value of the field device based on non-detection of the safety event by the hardware module and whether the hardware control signal was provided by the hardware module to cause the field device to enter the safe-state.

3. A field device associated with a safe-failure-fraction value and operatively coupled to a control element implemented in a safety instrumented system operatively coupled to a process control system, the field device comprising:

a hardware module operatively coupled to a software module, the hardware module classified as an SIS Type A module having all possible component failures defined and absent a processor and responsive to an occurrence of a safety event requiring the field device to be placed in a safe-state, whereupon detection of the occurrence of the safety event by the hardware module, the hardware module overrides normal control of the field device and provides a hardware control signal to the control element to cause the field device to enter the safe-state; and the software module classified as an SIS Type B module including an undefined component failure and a processor and including a processor operatively coupled to a memory and the control input of the control element, the software module monitoring the hardware control signal provided by the hardware module to determine whether the hardware module overrode normal control of the field device, the software module responsive to the occurrence of the safety event requiring the field device to be placed in the safe-state, whereupon detection of the occurrence of the safety event by the software module, the software module transmits a software control signal to the control element to cause the field device to enter the safe-state, and calculate the safe-failure-fraction value of the field device based on detection of the safety event by the hardware module and whether the hardware control signal was provided by the hardware module to cause the field device to enter the safe-state.

4. The system of claim 3, wherein the control element is a valve.

5. The system of claim 3, further comprising:
a transducer device operatively coupled to the hardware module, the software module, and the control element.

6. The system of claim 5, wherein the transducer device is a current-to-pressure (I/P) transducer or a voltage-to-pressure (E/P) transducer.

7. The system of claim 5, wherein the hardware control signal is provided to the transducer device.

8. The system of claim 5, wherein the software control signal is transmitted to the transducer device.

9. The system of claim 3, further comprising:
a sensor operatively coupled to the hardware module for detecting the occurrence of the safety event, whereupon detection of the occurrence of the safety event, the sensor initiates providing the hardware control signal to the control element, and the sensor operatively coupled to the software module for detecting the occurrence of the safety event, whereupon detection of the occurrence of the safety event, the sensor initiates transmission of the software control signal to the control element.

10. The system of claim 3, wherein the monitoring the hardware control signal includes a comparison of the hardware control signal to a safe-state signal.

11. A tangible non-transitory computer-readable medium operatively coupled to a safety instrumented system (SIS) and having instructions stored thereon for controlling a field device implemented in a safety instrumented system (SIS) operatively coupled to a process control system, wherein the instructions, when executed by one or more processors, cause the one or more processors to:

detect, by a hardware module classified as an SIS Type A module having all possible component failures defined and absent a processor, an occurrence of a safety event requiring a field device to be placed in a safe-state, the field device associated with a safe-failure-fraction value;

monitor, by a software module classified as an SIS Type B module including an undefined component failure and a processor, an override by the hardware module of normal control of the field device to cause the field device to enter the safe-state based on detection of the safety event by the hardware module;

detect, by the software module, the occurrence of the safety event requiring the field device to be placed in the safe-state;

transmit, by the software module, a software control signal to cause the field device to enter the safe-state; and calculate, by the software module, the safe-failure-fraction value of the field device based on detection of the safety event by the hardware module and whether the hardware control signal was provided by the hardware module to cause the field device to enter the safe-state.

12. The tangible non-transitory computer-readable medium of claim 11 having a further instruction stored thereon that, when executed by one or more processors, causes the one or more processors to:

calculate, by the software module, the safe-failure fraction value of the field device based on non-detection of the safety event by the hardware module and whether the hardware control signal was provided by the hardware module to cause the field device to enter the safe-state.

* * * * *